United States Patent
Macarthur et al.

(10) Patent No.: US 8,800,357 B2
(45) Date of Patent: Aug. 12, 2014

(54) BRAKE CABLE TENSIONING AND CALIBRATION SYSTEM AND METHOD

(75) Inventors: Benjamin B. Macarthur, Barrie (CA); Andrew Silver, Angus (CA)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 13/433,688

(22) Filed: Mar. 29, 2012

(65) Prior Publication Data
US 2013/0255052 A1 Oct. 3, 2013

(51) Int. Cl.
*G01M 17/00* (2006.01)

(52) U.S. Cl.
USPC .............................................. 73/132; 73/129

(58) Field of Classification Search
USPC .................... 73/121, 128, 129, 132
See application file for complete search history.

(56) References Cited

U.S. PATENT DOCUMENTS

| | | | |
|---|---|---|---|
| 3,943,761 A * | 3/1976 | Shoberg et al. | 73/862.474 |
| 4,362,053 A * | 12/1982 | Barrett | 73/121 |
| 4,373,402 A | 2/1983 | Barrett | |
| 5,787,761 A | 8/1998 | Wang | |
| 6,575,270 B2 | 6/2003 | Farenden | |
| 6,814,189 B2 | 11/2004 | Mai et al. | |
| 7,011,188 B2 | 3/2006 | Scheuring, III et al. | |
| 7,464,608 B2 | 12/2008 | Revelis et al. | |
| 7,578,216 B2 | 8/2009 | Sullivan | |
| 7,819,042 B2 * | 10/2010 | Petrak | 81/57.38 |
| 8,250,914 B2 * | 8/2012 | Sullivan | 73/121 |
| 2003/0075001 A1 * | 4/2003 | Petrak | 74/501.5 R |
| 2004/0129508 A1 * | 7/2004 | Scheuring et al. | 188/2 D |
| 2009/0031868 A1 * | 2/2009 | Petrak | 81/486 |
| 2009/0277261 A1 * | 11/2009 | Sullivan | 73/121 |

FOREIGN PATENT DOCUMENTS

CA 2690547 3/2011

OTHER PUBLICATIONS

Cable Tension Meter—CTM (www.checkline.com/cable_tension_meters/CTM?referrer=adwords&gclid-CITd_pv . . . ). Mar. 3, 2008—6 pages.
Digital Force Gauge—Imada Co., Ltd. Feb. 15, 2006—9 pages.
Cooper Instruments and Systems LFS Miniature S-Beam Load Cell (http://cooperinst.thomasnet.com/Asset/LFS270%20(3).pdf). May 23, 2008—1 page.
Canadian Patent Application No. 2690547, entitled "Cable Adjustment" filed Sep. 11, 2009 in the name of Honda Motor Co., Ltd.

* cited by examiner

*Primary Examiner* — Eric S McCall
(74) *Attorney, Agent, or Firm* — Rankin, Hill & Clark LLP

(57) ABSTRACT

Described are various embodiments of a brake cable tensioning system and method. In one embodiment, the system generally comprises a sensor mounted on a support structure for engagement with the cable in sensing a load applied thereby on the sensor, and a tensioning tool for adjusting a tension of the cable responsive to the sensor.

20 Claims, 5 Drawing Sheets

FIG - 4

BRAKE CABLE TENSIONING AND CALIBRATION SYSTEM AND METHOD

FIELD OF THE DISCLOSURE

The present disclosure relates generally to the automotive and similar industries, and in particular, to a brake cable tensioning and calibration system and method.

BACKGROUND

Various brake assemblies are known in the art to engage and release brakes in a vehicle, such as via a handbrake or footbrake assembly, by controlling a tension applied in one or more brake cables linking the two. For proper operation, brake cables must be adequately tensioned so to impart the desired action on the brakes when engaged, and equally release the brakes when disengaged.

Various devices and tools have been proposed for measuring and/or adjusting the tension in a brake cable, such as described in U.S. Pat. Nos. 7,578,216; 4,373,402; 7,464,508; 6,575,270; 6,814,189; 7,011,188; 5,787,761 and in Canadian Patent Application No. 2,690,547.

While the above provide different examples of cable tensioning tools, these tools can generally suffer from one or more drawbacks. For example, some known techniques may not provide reliable or consistent results, which can lead to undesirable variations in output brake tensions, for example, in the context of an assembly line. Similarly, some techniques may be overly difficult or cumbersome to implement or handle where time and efficiency is of greater importance, again for example, in the context of an assembly line. These and other drawbacks of known solutions will be readily apparent to the person skilled in the art.

Therefore, there remains a need for a brake cable tensioning and calibration system and method that overcome some of the drawbacks of known techniques, or at least, provides the public with a useful alternative.

This background information is provided to reveal information believed by the applicant to be of possible relevance to the present invention. No admission is necessarily intended, nor should be construed, that any of the preceding information constitutes prior art against the invention(s).

SUMMARY

An object of the invention is to provide a brake cable tensioning and calibration system and method that overcome some of the drawbacks of known apparatus, or at least, provides the public with a useful alternative. In accordance with one embodiment of the invention, there is provided a system for controlling a brake cable tension adjustment in a brake assembly, the brake assembly comprising at least one brake cable operatively coupled to a brake actuator moveable relative to a base of the assembly to act upon the cable between a release position and one or more selectable engagement positions, the device comprising: a sensing device; a support structure configured to rest upon the base of the assembly and thereby support and position said sensing device in operative engagement with the cable to sense a tension therein, said support structure further comprising a locating component arranged so to structurally engage the actuator only upon the actuator being in a preselected engagement position, and to otherwise structurally obstruct operative positioning of the support structure; and a tensioning tool for controllably adjusting the tension in response to said sensing device.

In accordance with another embodiment, there is provided a method for reproducibly adjusting tension in a brake cable of a brake assembly to a preset tension, the preset tension defined for a selectable engagement position of the brake assembly, wherein adjustment of the cable tension is provided via a threaded tensioning fastener having preset fastener characteristics, the method comprising: setting the brake assembly in the selectable engagement position for which the preset tension is defined; sensing a tension in the cable; computing, from said preset fastener characteristics and said sensed tension, a total rotation of the tensioning fastener that will impart a tension adjustment required to achieve the preset tension; communicating said total rotation to a fastening tool; and operating said fastening tool to automatically impart said total rotation to the tensioning fastener.

In accordance with another embodiment, there is provided a system for controlling a brake cable tension adjustment in a brake assembly, the brake assembly comprising at least one brake cable operatively coupled to a brake actuator moveable relative to a base of the assembly to act upon the cable between a release position and one or more selectable engagement positions, the system comprising: a support structure configured to rest reproducibly upon the base of the assembly alongside a cable path; a sensor assembly mounted to said support structure and comprising a sensor arm extending outwardly therefrom above the base to cross the path and thereby engage the cable such that a load is applied by the cable on the sensor arm, said sensor assembly further comprising a transducer for converting said load into a signal representative of the cable tension; and a tensioning tool for controllably adjusting the tension in response to said signal.

Other aims, objects, advantages and features of the invention will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

With reference to the disclosure herein and the appended figures, a device and method for brake cable tensioning and calibration will now be described, in accordance with different embodiments of the invention.

With reference to FIGS. 1 to 4, and in accordance with one embodiment of the invention, a brake cable tensioning system, generally referred to using the numeral 100, will now be described. The system 100 is generally provided for controlling a tension in or a tension adjustment to be applied to a brake assembly, generally referenced by the numeral 102. In particular, the system 100 comprises a tension measurement jig 104 configured to reproducibly measure a tension in a brake cable 106 of the assembly 102, and a tensioning tool, such as DC tool 108, operatively coupled to the jig 104, and configured to impart a tension adjustment to the cable 106 in response to the measured cable tension by fastening (or unfastening) a threaded tensioning fastener 110 of the brake assembly 102.

In this example, the brake assembly comprises an actuator 112 (i.e. handbrake handle assembly) operatively mounted on an actuator bracket 114 via mounting hardware 116 to pivot thereabout between a release position and a plurality of selectable engagement positions. For instance, by applying an upward rotation to the handle 112, a pawl 118 will be drawn along with a motion of the handle 112 to engage one of the plurality of corresponding notches defined within a periphery of a stationary toothed wheel segment 120 fixedly coupled to a base of the brake assembly. In the illustrated example, and as will be described in greater detail below, the actuator 112 is positioned in the upmost selectable engagement position (i.e. the pawl 118 is engaged with the upmost notch 122 of toothed wheel segment 120), thus presenting a maximum intended operational tension in the brake cable 106.

The brake cable 106 is coupled at a base 123 of the actuator via coupling hardware 124 such that an upward rotation of the actuator 112 draws the brake cable 106 forward to increase a tension applied thereto. This cable 106 extends toward the rear of the vehicle through the actuator mounting bracket 114 and is adjustably coupled to a cable splitting bracket 126, from which a pair of brake cables 128 lead to a corresponding pair of rear wheel parking or emergency brakes (not shown). In this particular example, the cable 106 terminates at splitting bracket 126 in a threaded rod 130 that extends through the splitting bracket 126 and is secured thereto by tensioning fastener 110. As will be readily appreciated by the skilled artisan, upon tightening the fastener 110, tension in the cable 106 (as well as in cables 128) will increase as the rod 130 is progressively drawn through the fastener 110, and vice versa.

Figure 4:
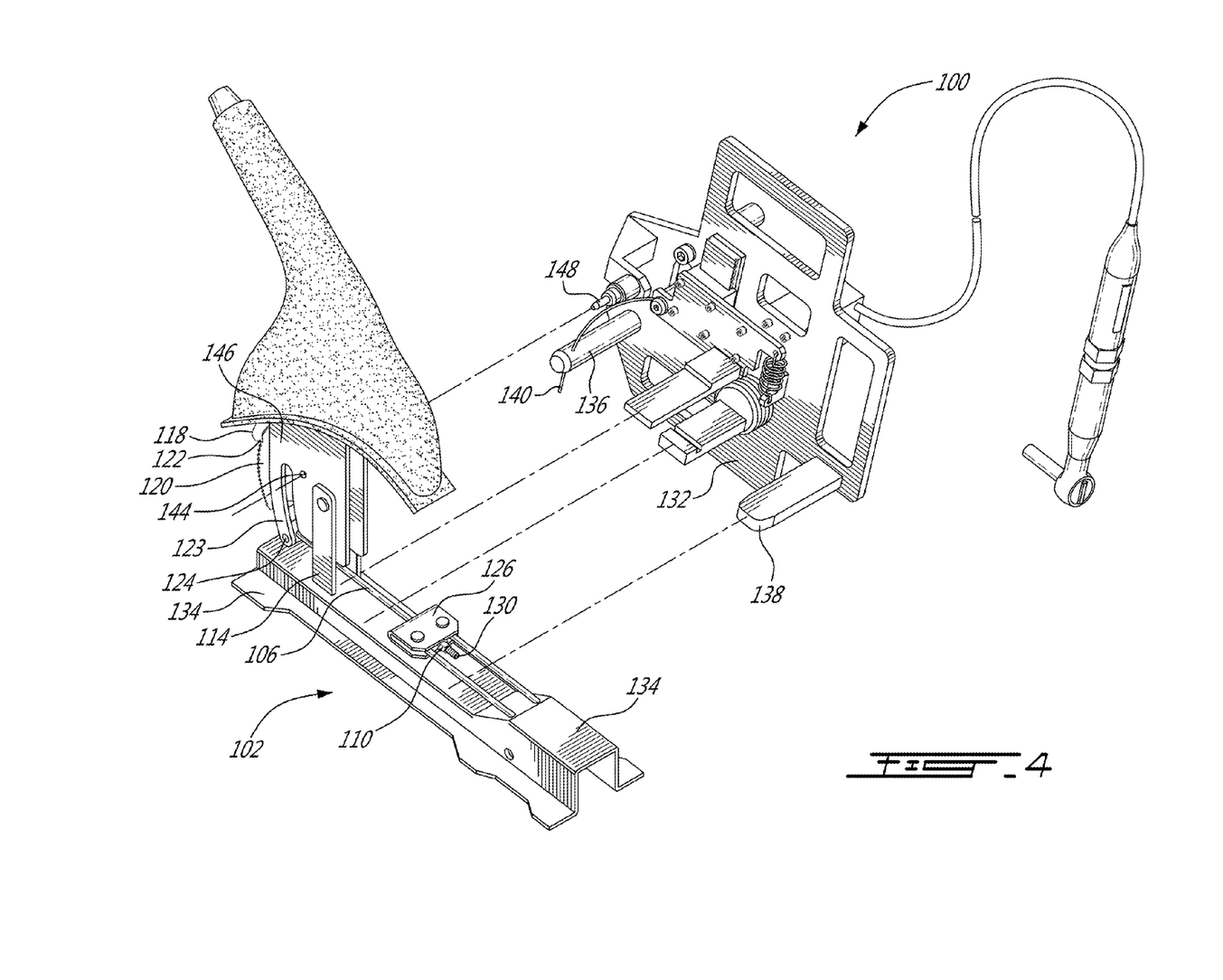
FIG. 4 is a front perspective view of the system of FIG. 3, after operation of the fastening tool thereof on the tensioning fastener, showing a reproducible alignment of the tension measurement jig with the brake assembly.

With particular reference to FIG. 4, the measurement jig 104 generally comprises a support structure 132 configured to rest on the base of the brake assembly 102 and run alongside a path of the brake cable 106. It will be appreciated that the brake assembly base may include not only the base bracket 134 of the brake assembly 102, but also include a base structure of the vehicle (not shown) on which the brake assembly is mounted and other parts and components fixedly installed within a region of the brake assembly. For example, in the context of an assembly line, the brake assembly will have generally been mounted and installed on the vehicle structure upstream of the brake cable tensioning station such that, positioning of the measurement jig 104 relative to the brake assembly 102 may be equally implemented as a function of vehicular base features in a region of this assembly. For the sake of the following description, however, focus will be maintained on specific structural features of the brake assembly itself, without intending for such focus to limit the overall scope and nature of the present disclosure.

In this particular embodiment, the measurement jig 104 further comprises a series of positioning pegs, such as positioning pegs 136 and 138, configured to extend from the support structure 132 to rest crosswise upon the base bracket 134 and thus provide a vertical reference for reproducibly positioning the jig 104 relative to the brake assembly 102. Peg 136 is further oriented and positioned so to engage the base 123 of the actuator 112 when in the upmost position, thereby providing a longitudinal positioning aid, and further includes a lateral positioning aid by way of curved rod member 140 that extends from the support structure 132 and through the peg 136 to laterally engage the base bracket 134 (see FIGS. 2 and 3). Peg 138 is rather positioned to run across and below the cable path (i.e. below cable pair 128). As will be appreciated by the skilled artisan, the provision of these and similar positioning elements may allow for the reproducible positioning of the measurement jig 104, which can thereby increase reproducibility of tension measurements and/or adjustments achieved thereby.

In order to further increase measurement, and ultimately tensioning, reproducibility, the system 100 is further configured to operate only when the actuator 112 is in a preset engagement position; in this embodiment, the preset engagement position consists of the upmost position (i.e. position exerting the highest tension). In providing a consistent and readily reproducible brake engagement position, the system may achieve a higher level of accuracy and reproducibility. Further, by engaging the actuator 112 at a selectable engagement position, that is a position manifested by a reproducible engagement of the pawl 118 with wheel 120, the user has both hands free to complete the jig installation, measurement and tensioning processes.

To ensure an operator of the system has properly activated the brake assembly prior to adjustment, the jig 104 further comprises a locating component 142 shaped, sized and positioned to extend from the support structure 132 so to engage a corresponding structural feature of the actuator 132 only upon the actuator being in the selected engagement position, and otherwise structurally obstruct positioning of the jig 104 along the cable path. For example, in this embodiment, and as best seen in FIG. 4, a hole or recess 144 is defined within a base portion 146 of the actuator at a distance from and extending substantially parallel to an axis of rotation of the actuator 112. Accordingly, as the actuator is moved from the release position to its preselected engagement position, this hole or recess is also moved along an arcuate path. The locating component 142, in this case consisting of a cylindrical element terminating into a locating pin 148 sized to correspond with the hole or recess 144, is configured to extend from the support structure such that, when the jig 104 is in position, the pin 148 can only engage the hole or recess 144 when the actuator is in its upmost position (e.g. see FIG. 3). Otherwise, advancement of the pin 148 will be obstructed by the inadequately positioned base portion 146, thereby obstructing overall positioning of the jig 104.

Once in position, the jig 104 can be used to provide a reliable measure of the cable tension. The jig 104 houses a sensing device 150 that comprises a sensor arm 152 that extends from the support structure 132 and, when the jig is in position, that crosses the cable's path to be engaged thereby (see FIG. 3). Upon there being at least some tension in the cable 106, a load is exerted by the cable 106 on the sensor arm 152, which is communicated, in this example, to a load cell of the sensing device which generates a signal representative of a tension in the cable. In one embodiment, the sensing device comprises a bending beam load cell, such as bending beam load cell model no. 8511-6002 (0+/−2000N) manufactured by Burster Praezisionsmesstechnik Gmbh and available through A Tech Instruments Ltd in Canada. The measured tension is then compared with a preset tension, and the difference used to calculate a required tension adjustment. In one embodiment, the required tension adjustment can be expressed as a function of a number of tensioning fastener rotations required to achieve this adjustment. For example, the tensioning fastener will generally have predefined thread characteristics such that a total rotation thereof required to impart a required tensioning adjustment can be calculated accurately. For instance, since changing the effective length of the cable 106 will have a predictable effect on the tension of the cable 106 in use, and where the thread characteristics are known for the tensioning fastener 110 and preset in the sensing device and/or tensioning tool, a total number of fastener rotations can be calculated to adjust an effective length of the cable 106 so to induce the required tension adjustment. Accordingly, upon calculating the required number of rotations (full and/or partial rotations), the tensioning tool can operated on the fastener 110 (see FIG. 3) to impart this calculated rotation and thereby achieve the preset tension.

In an alternative embodiment, rather than to calculate a total number of fastener rotations required, the system may rather monitor the cable tension in real-time as the tensioning tool 108 is operated on the fastener 110, and signal the tool 108 to stop upon reaching the preset tension.

Figures 5, 6, 7:
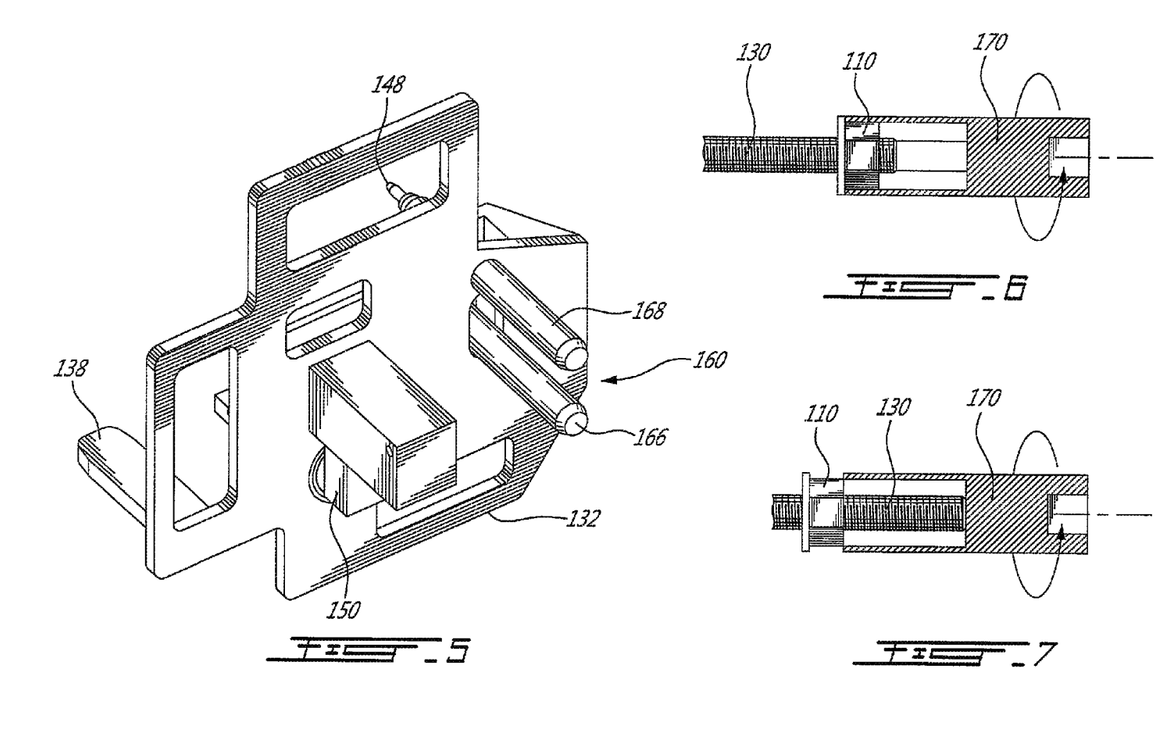
FIG. 5 is a rear perspective view of the tension measurement jig of FIG. 1.
FIGS. 6 and 7 are cross-sectional views of an output socket of the tensioning tool of FIG. 3 when operating on the tensioning fastener below, and upon reaching a preset cable tension, respectively, in accordance with one embodiment of the invention.

In one embodiment, the system 100 can be used for calibration, for example in an assembly line environment where parts and assemblies are generally expected to be provided and assembled within tightly controlled regulations and standards. In such an environment, the system 100 may be used to apply the required adjustment to a first brake assembly 102, and then, the structural characteristics of the assembly so adjusted may be used to apply similar adjustments to subsequent assemblies. For example, and as depicted in FIGS. 6 and 7, operation of the tensioning tool 108 on the tensioning fastener 110 will have for effect to draw the threaded termination rod 130 of the cable 106 through the fastener 110 to extend increasingly outwardly therefrom as the tension of the cable is increased. Once a first adjustment has been made to reach the preset or desired tension, the length of the termination rod 130 extending from the fastener 110 can be matched to the depth of a corresponding socket 170. Using this socket, operation of the tool 108 on the fastener 110 is only made possible up to the desired tension, at which point the socket 170 is automatically slipped off the fastener 110 by the protruding end of the rod 130. Using this approach, the system 100 is used as a calibration tool for selecting the appropriate socket to be used on subsequent assemblies to achieve the preset tension, or a tension within an acceptable tolerance thereof, without the need for measuring and controlling operation of the tool online for each subsequent assembly.

The skilled artisan will appreciate that these and other such techniques for controlling the tensioning tool as a function of the measured tension may be used within the present context to provide similar results, without departing from the general scope and nature of the present disclosure.

Figure 1:
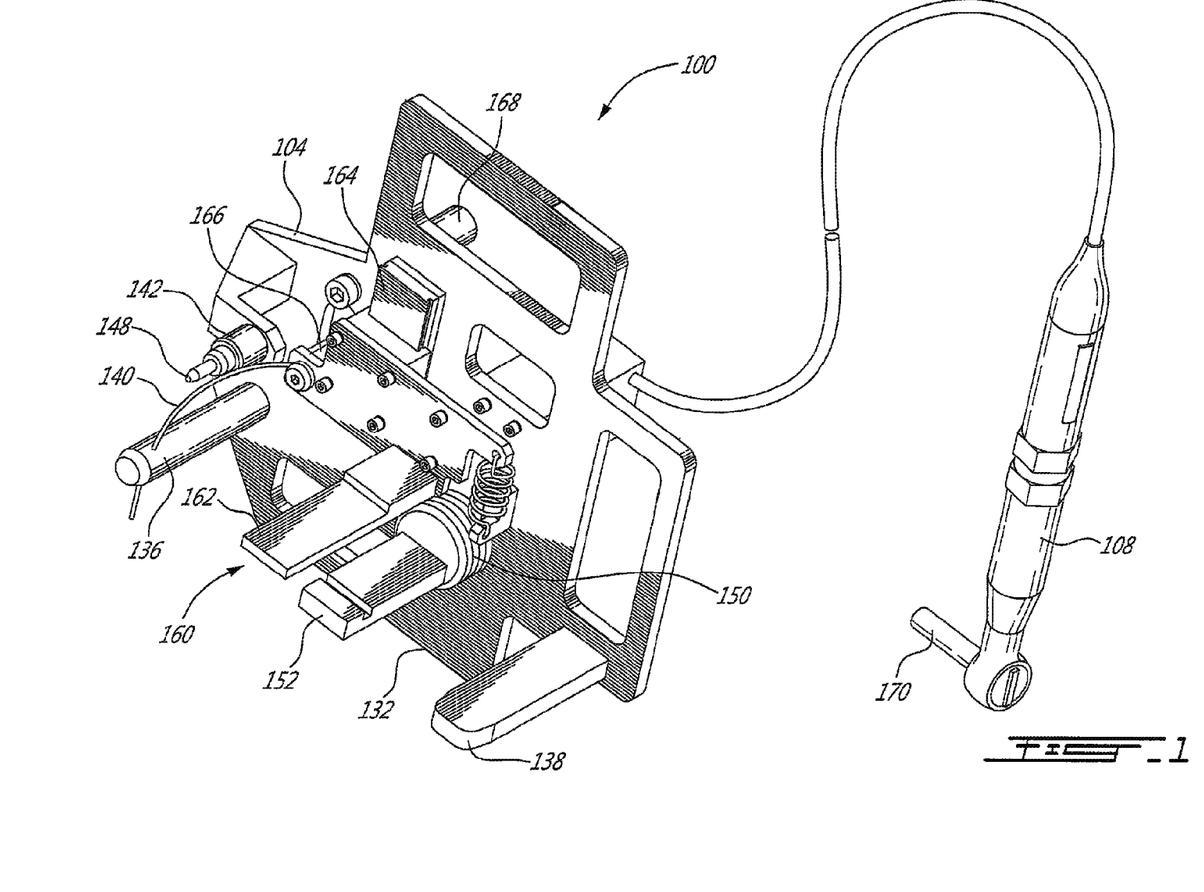
FIG. 1 is a front perspective view of a brake cable tensioning system, in accordance with one embodiment of the invention, comprising a tension measurement jig and a tensioning tool operated as a function thereof.
Figure 2:
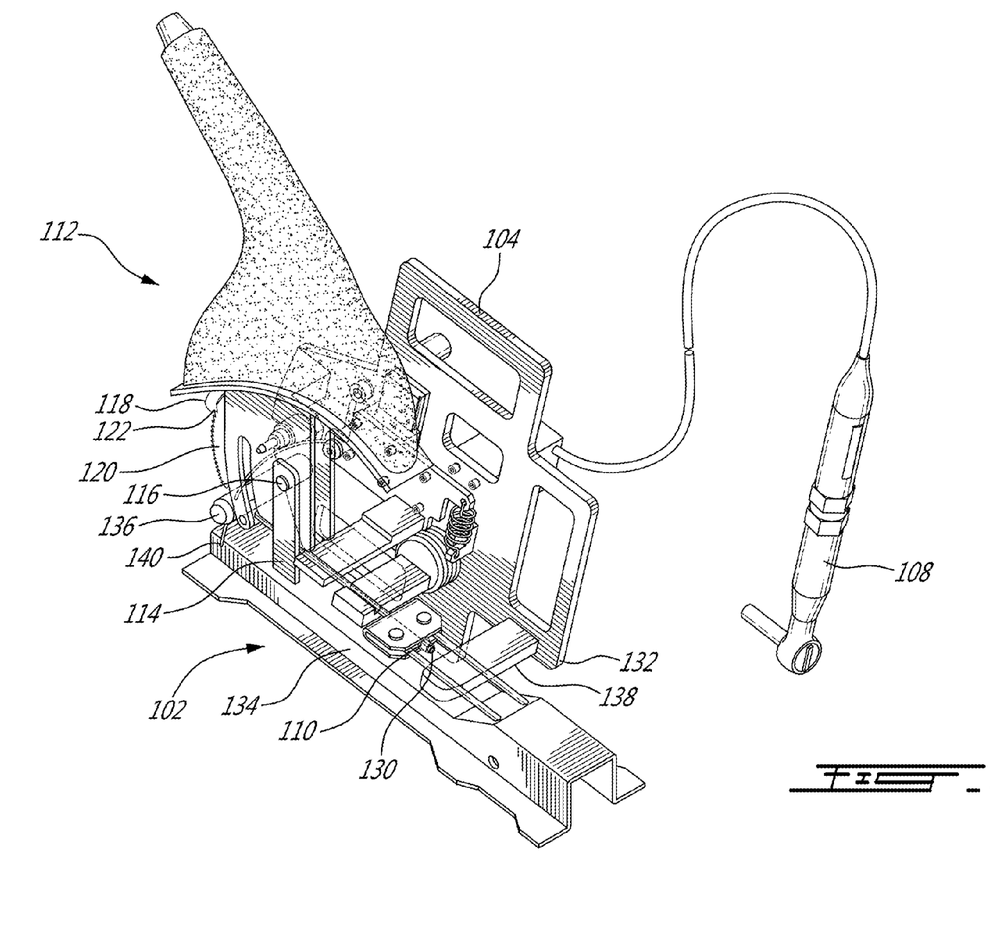
FIG. 2 is a front perspective view of the system of FIG. 1, positioned to measure a tension in a brake cable of a brake assembly having its actuator in its upmost selectable engagement position.
Figure 3:
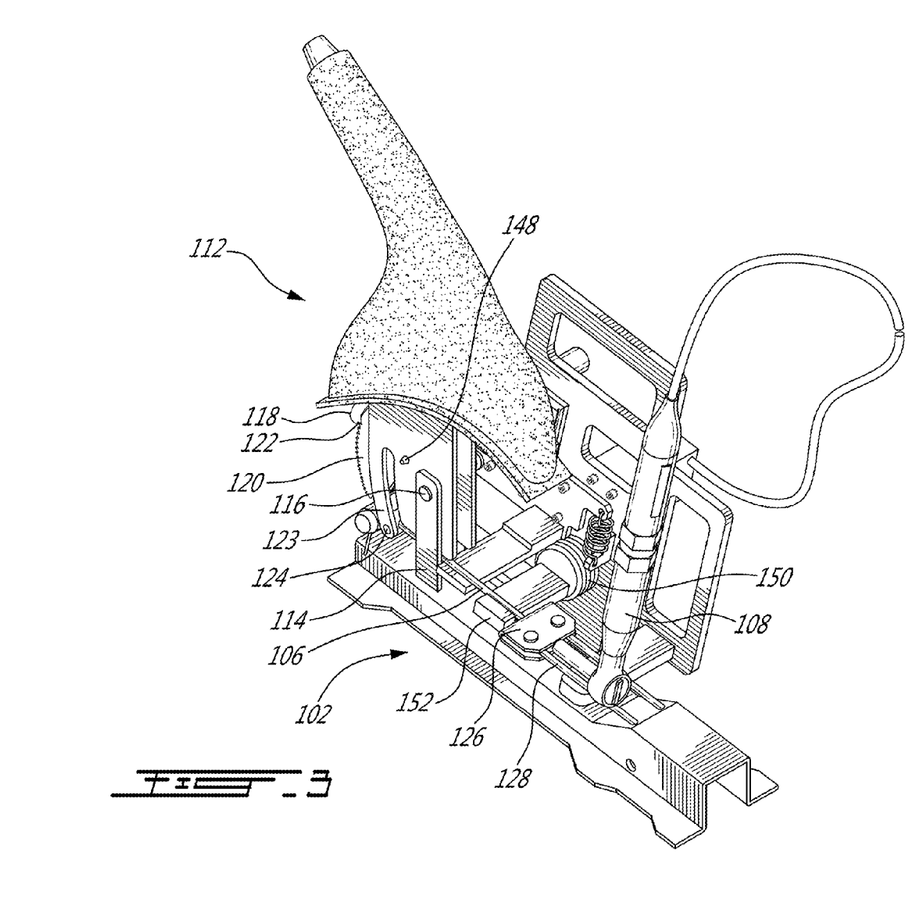
FIG. 3 is a front perspective view of the system of FIG. 2, showing operation of the fastening tool thereof on a tensioning fastener of the brake assembly to adjust the tension in the brake cable as a function of the measured tension.

With reference now to FIGS. 1 and 5, and in accordance with one embodiment, the jig 104 further comprises a cable lifting mechanism 160 to facilitate removal of the jig after use. In particular, mechanism 160 comprises a lifter arm 162 extending from the support structure 134 to extend across and below the cable 106 when in position. The lifter arm 162 is mounted to the structure 132 via a slideable coupler 164 allowing for motion of the lifter arm 162 relative to the structure 134 in a direction substantially perpendicular to the cable path. The mechanism 160 further comprises a first handle 166 fixedly coupled to the lifter arm 162 and a second handle 168 fixedly coupled to the structure 132, wherein, upon manual actuation of the first handle 166 relative to the second handle 168, the lifter arm 162 lifts the cable 106 thereby facilitating disengagement of the cable 106 from sensor arm 152 and withdrawal of the jig 104.

In accordance with one embodiment, operation of the system 100 is preceded with a cable tension relaxation procedure whereby the tensioning tool 108 is operated on the brake assembly in the release position to remove or at least reduce any relaxation in the cable prior to final tensioning. In one such example, the tool 108 is first operated on the tensioning fastener 110 to stretch the cable. In the context of a manufacturing assembly line where parts and components are provided within strict compliance criteria, the tool 108 may, for example, be operated to impart a preset total rotation to the tensioning fastener (e.g. a total number of rotations required to achieve a preset relaxation tension). Upon reaching this preset tension, the tool's operation may be reversed completely to release all cable tension, or again reiterated one or more times to ensure full relaxation of the cable (e.g. one or more stretch and release cycles). As will be appreciated by the skilled artisan, a given cycle or cycle combination may be preprogrammed in the system 100 or tool 108 itself to minimize operator intervention.

Once the pre-tensioning procedure has been completed (when applicable), the cable is returned to its released state. To implement the appropriate tension adjustment, the actuator is first moved to a preselected engagement position (in this example, its uppermost position). The jig 104 is then positioned along the cable path by securing each location peg 136 and 138, and rod member 140 on the base 134. Proper alignment and positioning of the actuator 112 is also verified via engagement of locating component pin 148 within actuator recess or hole 144 (see FIG. 2). In positioning the jig 104, the cable 106 will engage the receiving channel of sensor arm 152, and apply a load thereto representative of a tension in the cable. A tension in the cable can then be extracted from the sensed load, and compared with a preset tension.

From this comparison, and preset thread characteristics of the tensioning fastener 110, a total number of tensioning fastener rotations needed to adjust the cable tension to the preset tension can be calculated. This total number of rotation is then communicated to the tensioning tool 108 (see FIG. 3), which is positioned by the operator to act on the tensioning fastener and thus automatically achieve the desired cable tension.

Upon reaching the desired tension, the tool 108 can be removed and the jig 104 withdrawn (see FIG. 4). To do so, the cable lifter mechanism 160 can be used to effectively lift the cable 106 off the sensor arm 152, and facilitate withdrawal of the jig 104.

As noted above with reference to FIGS. 6 and 7, while the above operation can be repeated for each subsequent assembly, the operator may rather use a calibration achieved on a first assembly to select a proper slip-off socket 170 that can be used subsequently without the jig 104.

While the present disclosure describes various exemplary embodiments, the disclosure is not so limited. To the contrary, the disclosure is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A system for controlling a brake cable tension adjustment in a brake assembly, the brake assembly comprising at least one brake cable operatively coupled to a brake actuator moveable relative to a base of the assembly to act upon the cable between a release position and one or more selectable engagement positions, the system comprising:
   a sensing device;
   a support structure separate from the brake assembly and configured to rest upon the base of the assembly and thereby support and position said sensing device in operative engagement with the cable to sense a tension therein, said support structure further comprising a locating component arranged so to structurally engage the actuator only upon the actuator being in a preselected engagement position, and to otherwise structurally obstruct operative positioning of the support structure; and
   a tensioning tool for controllably adjusting the tension in response to said sensing device.

2. The system of claim 1, the actuator defining at least one structural feature moveable with the actuator relative to the base, said locating component shaped and sized to engage the structural feature.

3. The system of claim 2, the structural feature comprising a recess or a hole defined along an axis parallel to and distanced from an axis of rotation of the actuator about which it is moveable, said locating component comprising a pin shaped and sized for mating engagement with the recess or hole, and positioned for alignment therewith only upon the actuator being in the preselected engagement position.

4. The system of claim 1, said sensing device comprising a sensor arm extending from said structure such that, upon resting the structure along a path of the cable, said sensor arm extends across the path to be engaged by the cable, a load applied by the cable on the sensor arm indicative of the tension in the cable.

5. The system of claim 4, said sensor arm comprising a transverse channel formed therein for engagement with the cable in position.

6. The system of claim 4, further comprising a cable lifter mechanism having a lifter arm extending from said structure to extend across and below the cable when in position, said lifter arm mounted to said structure via a slideable coupler allowing for motion of said lifter arm relative to said structure in a direction substantially perpendicular to the cable path, said cable lifter mechanism comprising a first handle fixedly coupled to said lifter arm and a second handle fixedly coupled to said structure, wherein, upon manual actuation of said first handle relative to said second handle, said lifter arm lifts the cable thereby facilitating disengagement of the cable from said sensor arm for withdrawal.

7. The system of claim 1, said sensing device comprising a tension load cell.

8. The system of claim 1, wherein adjustment of the cable tension is provided via a threaded tensioning fastener having preset fastener characteristics, said sensing device configured to calculate a current tension in the cable and, from said preset fastener characteristics, calculate a total rotation of said tensioning fastener required to reach a preset cable tension, said calculated total rotation being communicated to said tensioning tool to be implemented thereby in achieving said preset cable tension.

9. The system of claim 1, said sensing device configured to calculate the cable tension in real time, said tensioning tool operated until a preset tension is sensed by said sensing device.

10. The system of claim 1, the preselected engagement position consisting of an upmost position.

11. A method for reproducibly adjusting tension in a brake cable of a brake assembly to a preset tension, the preset tension defined for a selectable engagement position of the brake assembly, wherein adjustment of the cable tension is provided via a threaded tensioning fastener having preset fastener characteristics, the method comprising:
   setting the brake assembly in the selectable engagement position for which the preset tension is defined;
   sensing a tension in the cable;
   computing, from said preset fastener characteristics and said sensed tension, a total rotation of the tensioning fastener that will impart a tension adjustment required to achieve the preset tension;
   communicating said total rotation to a fastening tool; and
   operating said fastening tool to automatically impart said total rotation to the tensioning fastener.

12. The method of claim 11, wherein adjustment of the cable tension is provided via the threaded tensioning fastener acting on a threaded rod of preset characteristics, a length of the threaded rod extending outwardly from the threaded tensioning fastener increasing with cable tension, the method further comprising:
   measuring the length of the threaded rod extending outwardly from the treaded tensioning fastener upon reaching the preset tension; and
   selecting a socket having a depth corresponding to said measured length for driving subsequent fasteners on subsequent brake assemblies, such that, upon reaching the preset tension in such subsequent brake assemblies, the fastener automatically slips out of said selected socket.

13. The method of claim 11, comprising, prior to said setting, stretching the cable via operation of said fastening tool on the fastener to apply a relaxation tension on the cable and thereby release relaxation in the cable prior to tension adjustment.

14. The method of claim 13, said stretching comprising applying the relaxation tension, releasing the relaxation tension, and re-applying the relaxation tension, prior to releasing the cable for adjustment.

15. A system for controlling a brake cable tension adjustment in a brake assembly, the brake assembly comprising at least one brake cable operatively coupled to a brake actuator moveable relative to a base of the assembly to act upon the cable between a release position and one or more selectable engagement positions, the system comprising:
   a support structure separate from the brake assembly and configured to rest reproducibly upon the base of the assembly alongside a cable path;
   a sensor assembly mounted to said support structure and comprising a sensor arm extending outwardly therefrom above the base to cross the path and thereby engage the cable such that a load is applied by the cable on the sensor arm, said sensor assembly further comprising a transducer for converting said load into a signal representative of the cable tension; and
   a tensioning tool for controllably adjusting the tension in response to said signal.

16. The system of claim 15, said support structure further comprising a locating component located so to structurally engage the actuator, upon resting the structure upon the base, only upon the actuator being in a preselected engagement position, and otherwise structurally obstruct operative positioning of the support structure.

17. The system of claim 16, the actuator having a recess or a hole defined therein along an axis parallel to and distanced from an axis of rotation of the actuator about which it is moveable, said locating component comprising a pin shaped and sized for mating engagement with the recess or hole, and positioned for alignment therewith only upon the actuator being in the preselected engagement position.

18. The system of claim 15, said sensor arm comprising a transverse channel formed therein for engagement with the cable.

19. The system of claim 15, further comprising a cable lifter mechanism having a lifter arm extending from said structure to extend across and below the cable when in position, said lifter arm mounted to said structure via a slideable coupler allowing for motion of said lifter arm relative to said structure in a direction substantially perpendicular to the cable path, said cable lifter mechanism comprising a first handle fixedly coupled to said lifter arm and a second handle fixedly coupled to said structure, wherein, upon manual actuation of said first handle relative to said second handle, said lifter arm lifts the cable to release said load and thereby facilitate disengagement of said sensor assembly.

20. The system of claim 15, wherein adjustment of the cable tension is provided via a threaded fastener having preset fastener characteristics, said sensor assembly configured to calculate a current tension in the cable and, from said preset fastener characteristics, calculate a total rotation of said fastener required to reach a preset cable tension, said calculated total rotation being communicated to said tensioning tool to be implemented thereby in achieving said preset cable tension.

* * * * *